Oct. 9, 1945.  J. BOLSEY  2,386,538
BODY FOR APPARATUS OR THE LIKE, PARTICULARLY FOR PHOTOGRAPHIC APPARATUS
Filed Nov. 8, 1943  3 Sheets-Sheet 1

INVENTOR.
JACQUES BOLSEY
BY Michael S. Striker
agent

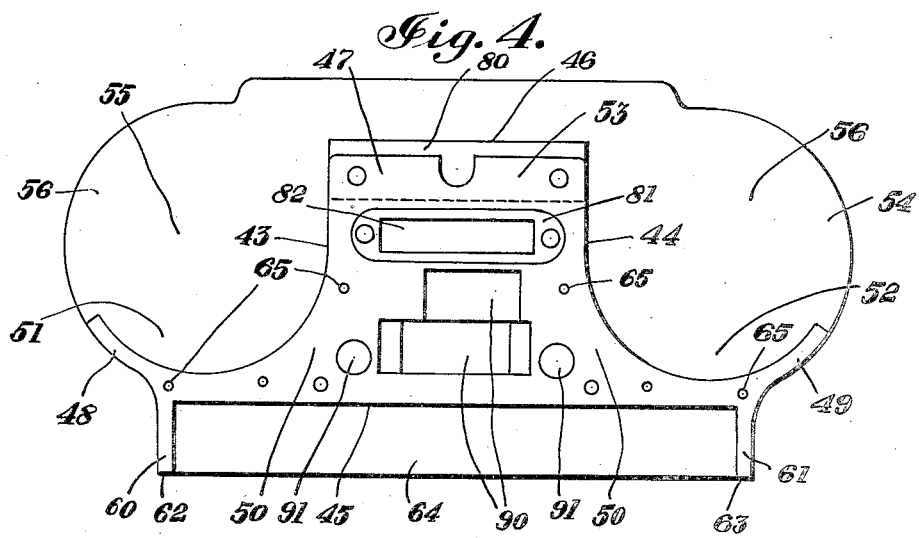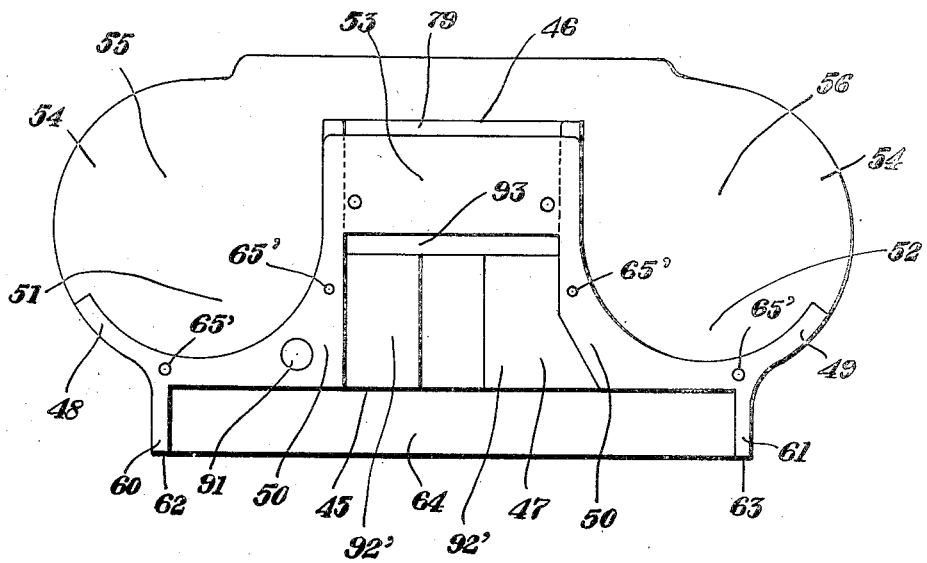

Oct. 9, 1945. J. BOLSEY 2,386,538
BODY FOR APPARATUS OR THE LIKE, PARTICULARLY FOR PHOTOGRAPHIC APPARATUS
Filed Nov. 8, 1943 3 Sheets-Sheet 3
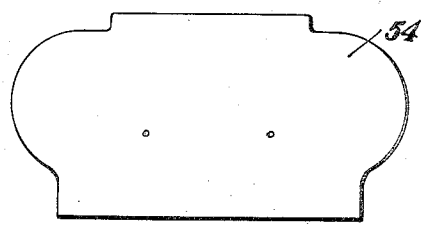
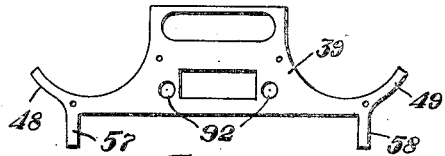
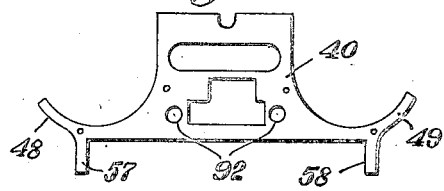
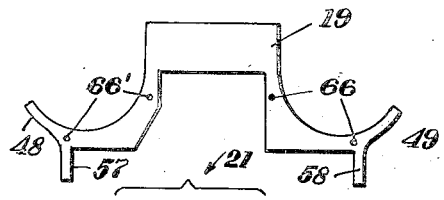
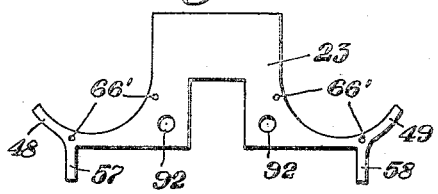
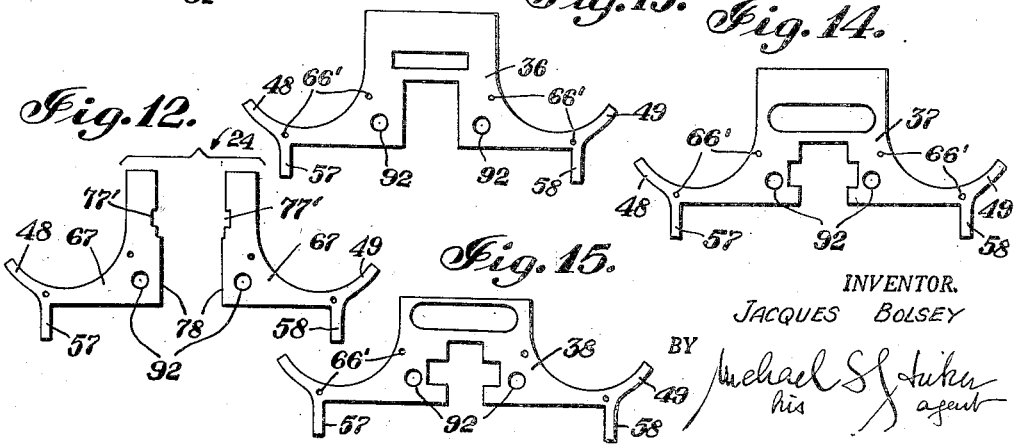
INVENTOR.
JACQUES BOLSEY Patented Oct. 9, 1945

2,386,538

UNITED STATES PATENT OFFICE 2,386,538

BODY FOR APPARATUS OR THE LIKE, PARTICULARLY FOR PHOTOGRAPHIC APPARATUS

Jacques Bolsey, New York, N. Y.

Application November 8, 1943, Serial No. 509,400

5 Claims. (Cl. 95—11)

My present invention relates to bodies for apparatus, devices, machines or the like, and more particularly to bodies for photographic cameras.

It is an object of my present invention to construct apparatus bodies or the like in a way enabling easy assembling and manufacturing of these bodies.

It is a further object of my present invention to provide bodies for apparatus, devices, machines or the like in which cavities within these bodies are formed by combining the parts of these bodies in a certain entirely new way, eliminating the necessity of producing these cavities by turning, drilling or like treatment of the bodies.

A further object of my present invention consists in an apparatus body in which the outer configuration of the body is obtained by composing the body in an entirely new way, not done heretofore.

Another object of my present invention consists in a body for a photographic camera in which the exposure chamber and space for the lens is formed by composing the camera body of parts of an entirely new type.

Still another object of my present invention consists in a camera body in which the shutter and magazine compartments are formed by combining the camera body from plates so as to substantially avoid any necessity for casting, turning, shaping or the like in producing the camera.

With the above objects in view, my present invention mainly consists of an apparatus body composed of superimposed laminations of different shape, forming by their different shape at least one cavity within this body; means are also provided for securing these superimposed differently shaped laminations to each other.

These laminations preferably consist of thin metallic or plastic plates secured by bolts, screws, or by welding or fusing to each other. In case of plastic laminations, i. e. thin plastic plates, it is easily possible to secure the superimposed laminations to each other by application of heat in case of thermoplastic materials or otherwise by application of a solvent or glue.

The cavities mentioned above can be obtained by laminations having differing contours, for instance by providing cut-outs of predetermined shape in some of the laminations, while the others have no such cut-outs; all the laminations, those with and those without cut-outs, are superimposed upon each other in such a manner that these cut-outs form at least one cavity of required shape within the body; as mentioned above, means are provided to secure these differently shaped laminations in correct superimposition to each other.

It is possible to produce in apparatus bodies or the like by the above described means cavities of the most different shapes. Thus, for instance, if it is intended to manufacture a body having a longitudinal hole passing therethrough, the body might be composed of a plurality of superimposed lamination layers arranged parallel to the longitudinal axis of this hole in such a manner that the lamination layers forming the body part on both sides of this hole consist each of one lamination only and the lamination layers forming the body part containing said hole consist each of two laminations spaced from each other, one on each side of the hole; these lamination layers, formed by one and two laminations respectively, are then secured in correct superimposition to each other so that the spaced laminations form the hole within the apparatus body.

If it is desired to produce an apparatus body or the like provided with an open cavity therein, the body is composed of a plurality of superimposed laminations arranged parallel to the direction of the depth of this open cavity in such a manner that the laminations forming the body part on both sides of this cavity reach to the body surface in which this open cavity is located and the laminations forming the body part in which this open cavity is located are provided with cut-outs corresponding in shape to the cross section of this cavity so as to form this cavity when superimposed upon each other; these laminations have to be secured in correct superimposition to each other so that the laminations containing the cut-outs form that body part which contains said open cavity and the other laminations form the body parts adjacent thereto.

In case of a body with a longitudinal open cavity having opposite plane and parallel longitudinal faces which are normal to that face of the body in which this cavity is located, the body is composed of a number of superimposed laminations arranged parallel to the direction of this longitudinal cavity normal to the body face containing said cavity; the laminations forming the body parts on both sides of this longitudinal cavity reach to the body face while the laminations forming the body part in which the cavity is located are provided with cut-outs corresponding in shape to the cross-section of this cavity. All these laminations are secured to each other as described in the preceding paragraph.

If it is required to make an apparatus body or the like provided with a slot reaching from one face of the body to an opposite face thereof, the body is composed of a plurality of superimposed laminations arranged parallel to the direction of this slot in such a manner that the laminations forming the body parts on both sides of this slot reach to the body surface in which the slot is located and the laminations forming the slot part of the body are shorter in direction normal to this slot by a distance equal to the depth of the slot; so these shorter slot laminations form together with the laminations on both sides of the slot the slot itself, when all laminations are superimposed upon each other with said shorter laminations not reaching to the body face in which the slot is located. Thus, if all laminations are secured to each other, in correct superimposition, the shorter laminations form the slot part of the body and the other laminations form those body parts which are located adjacent to the body part containing the slot.

In order to produce an apparatus body having an outer plane face and a cylindrical open cavity arranged normal to this face, the body is composed of a plurality of superimposed laminations arranged normal to this face in such a manner that the laminations forming the body parts on both sides of this cylindrical open cavity reach to this face and the laminations forming the body part in which the cylindrical open cavity is located are provided with differently shaped cut-outs; each of these lamination cut-outs has two opposite parallel edges which are normal to that outer lamination edge which forms part of the plane body face in which said cylindrical open cavity is arranged; all these cut-outs are shaped so as to form a cylindrical cavity when all the laminations, those with and those without cut-outs, are superimposed upon each other; this of course necessitates that in the various laminations the distance between the two opposite parallel edges of the cut-outs differs. It should also be mentioned that the cylindrical surface of this cavity will not be entirely smooth since it is formed by laminations; but in most cases, the roughness of this surface does not matter. Should it be desirable, then it is of course also possible to finish this cylindrical surface by polishing or in similar way.

I have found that my present invention is particularly well adapted for producing camera bodies. In this case, the camera body consists of a plurality of body laminations having substantially identical contours; these body laminations are arranged parallel to the top and bottom faces of the camera body and provided with equal cut-outs forming, when the laminations are superimposed with their contours corresponding to each other, spaces open at the top and bottom of the camera body; some of these spaces are open at the front and some at the rear; the camera body is completed by one top and one bottom lamination having no cut-outs and being superimposed upon the top and bottom respectively of the laminated camera body forming compartments within the camera body, some of which are closed on all sides except at the rear and some of which are closed on all sides except at the front.

A preferred embodiment of my new camera body comprises a plurality of body laminations having substantially identical contours and being superimposed upon each other arranged parallel to the top and bottom faces of the camera body; each of these body laminations is provided with two substantially semi-circular cutouts at its rear edge and two symmetrical projections at its front edge spaced apart from each other so as to form, when these laminations are superimposed upon each other in the rear face of the laminated camera body semi-cylindrical spaces open at the top, bottom and rear and in the front face of said camera body a longitudinal flat space open at the top, bottom and front; this camera body is completed by at least one top and one bottom lamination without cut-outs, superimposed upon the top and bottom respectively of the laminated camera body and closing said semi-cylindrical spaces in the rear as well as said longitudinal flat space in the front at the top and bottom, thereby forming two semi-cylindrical compartments for a film magazine in the rear face of the camera body closed at all sides except at the rear and a longitudinal flat compartment for a shutter mechanism in the front face of the camera body closed at all sides except at the front.

The novel features which I consider characteristic of my invention are set forth in particular in the appended claims. The invention itself, however, both as to its construction and its method of operation, together with additional objects and advantages thereof, will be best understood from the following description of specific embodiments when read in connection with the accompanying drawings in which:

Fig. 4 is a top view of the camera body shown in Figs. 1 to 3 with the top plate removed;

Fig. 5 is a bottom view of the same camera body with the bottom plate removed;

Fig. 6 is a plane view of a plate adapted to serve as top and bottom plate of the camera; and Figs. 7 to 17 show various laminations of which the camera body shown in Figs. 1 to 5 is composed.

Figure 1:
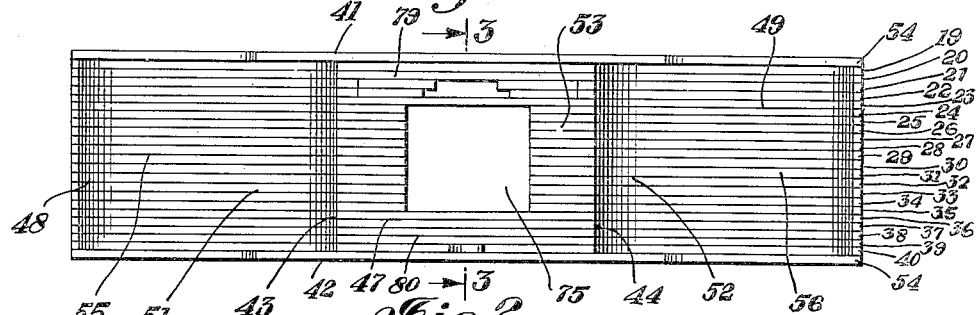
Fig. 1 is a rear view of a camera body composed of laminations.

As shown in Figs. 1 to 5, the camera body is composed of a plurality of body lamination layers 19 to 40 superimposed upon each other and arranged parallel to the top and bottom faces 41 and 42 of the camera body. These body lamination layers have substantially identical contours and are superimposed upon each other with their contours corresponding to each other and thus forming the side faces 43, 44, the front face 45 and the rear face 46 of the camera body. Each of these body lamination layers 19 to 40 comprises a substantially rectangular lamination layer portion 47 and is provided with two substantially semi-circular projections 48 and 49 at the front ends 50 of the two opposite side edges 43 and 44 of the lamination layer portion 47; these substantially semicircular projections are open at the rear. Thus, these lamination layers 19 to 40 form, when superimposed upon each other as shown in Figs. 1, 4 and 5, two substantially semi-cylindrical spaces 51 and 52 on both sides of the central camera body 53 which is formed by the superimposed rectangular lamination layer portions 47 of the body lamination layers 29 to 40.

Top and bottom plates 54 of the type shown in Fig. 6 are superimposed upon the top 41 and bottom 42 respectively of the superimposed body lamination layers 19 to 40. These bottom and top plates 54 are shaped in such a manner as to cover also the semi-cylindrical spaces 51 and 52 formed by the substantially semi-circular projections 48 and 49 of the superimposed body lamination layers 19 to 40. Thus, these plates 54 form together with the body lamination layers 19 to 40 semi-cylindrical compartments 55 and 56 on both sides of the central camera body 53 which compartments are closed at the top, the bottom and all sides except at the rear. These compartments may serve for accommodating the film coil containers of a film magazine of the type disclosed in my co-pending U. S. patent application Serial No. 433,541 entitled "Photographic camera," filed March 6, 1942, now Patent Number 2,367,195, issued January 16, 1945.

Each of the body lamination layers 19 to 40 is also provided with two projections 57 and 58 at its front edge near the ends thereof, preferably one at each of the front edges of the projections 48 and 49 respectively. The projections 57 and 58 of all superimposed lamination layers 19 to 40 form two parallel projecting walls 60 and 61 on the front face 45 of the laminated camera body formed by the superimposed body lamination layers 19 to 40. These parallel projecting walls 60 and 61 extend from the top 41 to the bottom 42 of the camera body. As clearly shown in Figs. 4 to 6, the top and bottom plates 54 reach when superimposed upon the top and bottom respectively of the superimposed body lamination layers 19 to 40 to the front edges 62 and 63 of the projecting walls 60 and 61; thus these projecting walls 60 and 61 form together with the top and bottom plates 54 in front of the camera body a longitudinal rectangular compartment 64 for a shutter mechanism. This compartment is, as clearly shown in the drawings in Fig. 2, closed at the top, the bottom and all sides, except at the front.

I wish to note the fact that all compartments, i. e. the semi-cylindrical rear compartments 55 and 56 and the front compartment 64, are all formed solely and exclusively by the different shape of the body laminations and of the top and bottom plates 54 which from the point of view of the present invention have to be considered also nothing else than laminations.

It is evident that after assembling the superimposed lamination layers 19 to 40 together with the top and bottom plates 54 have to be secured to each other. This is done by rivets 65' passing through corresponding holes 66' shown in Figures 7 to 17 of the drawings.

The lamination layers 19 to 40 are provided with various cut-outs; some of the lamination layers even consist of two laminations spaced apart from each other. In this way I obtain in accordance with my present invention various slots, passages, holes, and cavities in the camera body which house the camera mechanism and the operating means.

Figure 2:
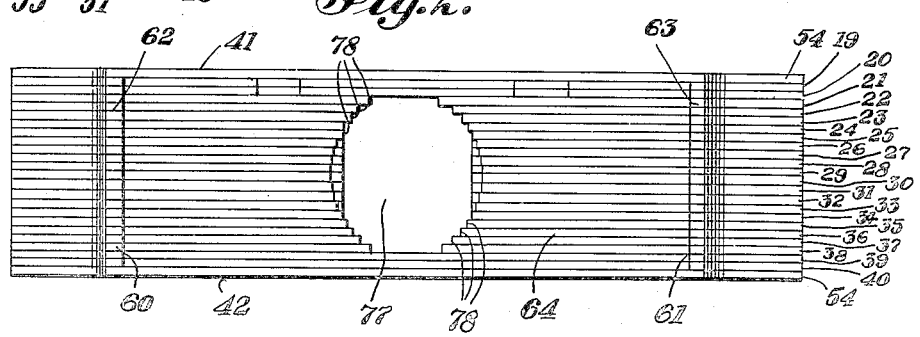
Fig. 2 is a front view of the same camera body.
Figure 3:
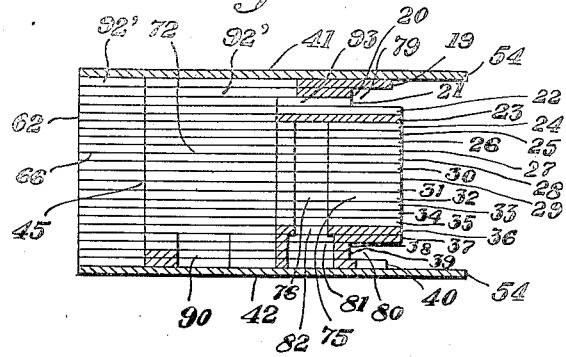
Fig. 3 is a cross section of the camera body shown in Figs. 1 and 2 along line 3—3 of Fig. 1.

The body laminations shown in Figs. 7 to 17 are provided with the same reference numbers as the corresponding lamination layers shown in Figs. 1 to 3 except the lamination layers 21, 22 and the middle lamination layers 24 to 35 inclusive which consist each of two laminations spaced from each other. Thus, lamination layer 21 is composed of two identical laminations 65 shown in Fig. 9, lamination layer 22 of two laminations 66 shown in Fig. 10, and each of the middle lamination layers 24 to 35 inclusive of two laminations 67 of the type shown in Fig. 12.

Since Figs. 1 to 3 clearly show the single lamination layers 19 to 40 and Figs. 7 to 17 clearly show the single laminations of which these lamination layers are composed, a detailed description of each lamination separately seems superfluous. Therefore, in the following I will describe in detail only how these differently shaped laminations form in accordance with my present invention various cavities, slots, holes, and the like in the camera body. It should be stressed that these cavities, holes, slots, grooves, and the like might extend in any required direction, i. e. from the top to the bottom, from the front to the rear, and from one side to the other. Of course, it is also possible to produce by various cut-outs and/or holes in the single laminations cavities passing through the camera body in diagonal or any other desired direction.

Thus, for instance, the substantially cube-shaped compartment 75 is formed by composing each of the lamination layers 24 to 35 of two laminations 67 spaced from each other and covering the space formed by these laminations 67 by the upper and lower lamination layers 19 to 23 and 36 to 40 respectively. In this way, it is very simple to provide inside of a body an exactly cube-shaped compartment without any casting or other complicated treatment of the work-piece on lathes, drilling and shaping machines, or the like.

Similarly, groove 76 in two walls of this cube-shaped compartment 75 is obtained in an extremely simple way of providing in the corresponding laminations 67 little cut-outs 77', as shown in Fig. 12.

The substantially cylindrical compartment 77 is obtained, as clearly shown in Fig. 2, by cut-outs in the single laminations 23, 36, 37, and 38 and by spaced pairs of laminations 67 arranged in such a manner that their edges 78 form the cylindrical compartment within the camera body. For this purpose, each pair of laminations 67 differs from the others as shown in Fig. 2 in the distance of their edges 78 from each other. Of course, as already mentioned above, the wall of this cylindrical compartment 77 will not be entirely smooth but any required degree of smoothness can be obtained by polishing the inner surface of this compartment after assembling the body as described above.

Similarly, the slots 79 and 80 in the rear face 46 of the camera body are obtained by making the laminations 20, 21 and 38, 39 respectively shorter than the adjacent laminations 19, 22 and 37, 40 respectively. Thus, it is evident that by assembling the laminations in correct superimposition the shorter laminations 20, 21 and 38, 39 respectively will form slots 79 and 80 in the camera body.

Combination of the substantially elliptical hole 81 with the rectangular aperture 82 is easily obtained by providing in the laminations 37 to 40 elliptical apertures and in the lamination 36 a rectangular aperture as shown in Figs. 14 to 17 and 13 respectively. In the same way, it is possible to obtain the compartment 90, which has a rather intricate shape, by simple cut-outs and apertures in the laminations 37 to 40 forming this compartment.

It is evident that it is possible to make holes similar to the cylindrical compartment 77 also in other directions, e. g. normal thereto. Thus, for instance, the holes 91 are formed by circular apertures 92 in the laminations forming the lamination layers 22 to 40 as shown in Figs. 10 to 17 inclusive.

The relatively flat recess 92' which is combined with slot 93 in a rather complicated way can hardly, if at all, be obtained by drilling, turning or the like, while it is extremely simple to obtain this combined recess and slot in accordance with the present invention by providing in the lamination layers 19 to 22 cut-outs as shown in Figs. 7 to 10 inclusive.

It should be stressed that the above described compartments, slots, grooves, and holes extend in practically all possible directions: thus, the cube-shaped compartment 75 and cylindrical cavity 77 extend from the front face 45 to the rear face 46 of the camera body. Compartments 81 and 90 and holes 91 extend normal thereto in direction from the top 41 to the bottom 42 of the camera body, while slots 79 and 80 extend normal thereto from the side face 43 to the side face 44 of the body. In addition thereto, the compartments 55, 56, and 64 are formed by the outer contour line of the equally shaped body lamination layers 19 to 40 and by additional laminations, namely the top and bottom plates 65 superimposed on the top and bottom, respectively, of the assembled camera body. Thus, in accordance with my present invention, it is possible to obtain simply by differently shaped laminations in a camera body as well as in bodies of other apparatus, devices and machines cavities, holes, compartments, slots, passages, grooves and the like, of any required shape, simply by providing adequate, e. g. stamped cut-outs in the laminations of which the body is composed.

It will be understood that each of the elements described above, or two or more together, may also find a useful application in other types of apparatus bodies differing from the types described above.

While I have illustrated and described the invention as embodies in camera bodies, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letter Patent is:

1. A camera body comprising a plurality of body lamination layers having substantially identical corresponding outer contours and superimposed with said contours corresponding to each other parallel to the top and bottom faces of said camera body and secured to each other; each of the outer lamination layers near said top and bottom faces of said camera body consisting of one single lamination plate and each of the inner lamination layers arranged between said outer lamination layers composed of two narrower lamination plates spaced apart from each other so as to form between them within said camera body an exposure chamber; all said lamination layers being provided with two equal cut-outs at their edges in such a manner as to form two spaces each of which is open at the top and bottom of said camera body but closed at all sides except at the front or the rear; and at least one top and one bottom lamination layer having at least substantially the same outer contours as said body lamination layers but having no cut-outs superimposed upon the top and bottom, respectively, of said laminated camera body covering also said two open spaces within the same, thus forming within said camera body two film compartments closed at all sides except at the rear.

2. A camera body comprising a plurality of body lamination layers having substantially identical corresponding outer contours and superimposed with said contours corresponding to each other parallel to the top and bottom faces of said camera body and secured to each other; each of the outer lamination layers near said top and bottom faces of said camera body consisting of one single lamination plate and each of the inner lamination layers arranged between said outer lamination layers composed of two narrower lamination plates spaced apart from each other so as to form between them within said camera body a central exposure chamber; each of said body lamination layers being provided with two substantially semi-circular cut-outs at its rear edge and two symmetrical projections at its front edge spaced apart from each other so as to form two semi-cylindrical rear spaces open at the top, bottom and rear in the rear face of said laminated camera body and a longitudinal flat front space open at the top, bottom and front in the front face of said camera body; and at least one top and one bottom lamination layer having at least substantially the same outer contours as said body lamination layers but having no cut-outs superimposed upon the top and bottom respectively of said laminated camera body covering said front and rear spaces within the same, thus forming within said camera body two film compartments on opposite sides of said central exposure chamber closed at all sides except at the rear.

3. A camera body comprising a plurality of body lamination layers, said body lamination layers superimposed upon each other parallel to the top and bottom face of said camera body; each of the body lamination layers near said top and bottom of said camera body consisting of one single lamination plate and the lamination layers arranged between said top and bottom lamination layers composed each of two narrower lamination plates spaced from each other so as to form between them within said camera body a central exposure chamber; said superimposed body lamination layers having substantially identical corresponding outer contours forming the side, front and rear faces of said camera body; each of said body lamination layers consisting of a substantially rectangular lamination layer portion provided with two curved projections at the front ends of the two opposite side edges of said rectangular lamination layer portion, said curved projections being open at the rear, thus said lamination layers forming two substantially semi-cylindrical spaces on both sides of said central exposure chamber in the central camera body formed by said superimposed substantially rectangular lamination layer portions of said body lamination layers; and a top and a bottom plate having each at least substantially the same outer contours as said body lamination layers but having no cut-outs the top and bottom respectively of said superimposed body lamination layers and in such a manner as to cover also said semi-cylindrical spaces formed by said superimposed body lamination layers, thus said superimposed body lamination layers together with said top and bottom plates forming within said camera body semi-cylindrical film compartments on both sides of said central exposure chamber in said central camera body being closed at the top, at the bottom, and at all sides except the rear.

4. A camera body comprising a plurality of body lamination layers, said body lamination layers being superimposed upon each other parallel to the top and bottom face of said camera body; each of the body lamination layers near the top and bottom of said camera body consisting of one single lamination plate and the lamination layers arranged between said top and bottom lamination layers composed each of two narrower lamination plates spaced apart from each other so as to form between them within said camera body a central exposure chamber; said body superimposed lamination layers having substantially identical corresponding outer contours which are forming the side, front and rear faces of said camera body; each of said body lamination layers provided with two projections at its front edge near the ends thereof, thus said projections on all said body lamination layers forming two parallel projecting walls on the front face of said camera body formed by said superimposed lamination layers, said parallel projecting walls extending from the top to the bottom of said superimposed body lamination layers; and a top and bottom plate having each at least substantially the same outer contours as said body lamination layers but having no cut-outs superimposed upon the top and bottom respectively of said superimposed body lamination layers and shaped in such a manner as to reach to the tips of said projections, thus said superimposed body lamination layers together with said top and bottom plates forming within said camera body a shutter compartment for a shutter mechanism in front of said central exposure chamber in the camera body which is closed at the top, at the bottom and at all sides except the front.

5. A camera body composed of a plurality of body lamination layers, said body lamination layers superimposed upon each other parallel to the top and bottom face of said camera body; each of the body lamination layers near the top and bottom of said camera body consisting of one single lamination plate and the lamination layers arranged between said top and bottom lamination layers composed each of two narrower lamination plates spaced apart from each other so as to form between them within said camera body a central exposure chamber; said superimposed body lamination layers having substantially identical corresponding outer contours forming the side, front and rear faces of said camera body; each of said body lamination layers consisting of a substantially rectangular lamination layer portion provided with two curved projections at the front ends of the two opposite side edges of said rectangular lamination layer portion, said curved projections being open at the rear, thus said lamination layers forming two substantially semi-cylindrical spaces on both sides of said central exposure chamber in the central camera body formed by said superimposed substantially rectangular lamination layer portions of said body lamination layers; each of said body lamination layers provided also with two projections extending parallel to each other and normal to the front edge of the respective body lamination layers and arranged spaced from each other on those portions of said front edge which are formed by said curved projections, thus said projections on all said body lamination layers also forming two parallel projecting walls on the front face of the camera body formed by said superimposed lamination layers, said parallel projecting walls extending from the top to the bottom face of said superimposed body lamination layers; and a top and bottom plate having each at least substantially the same outer contours as said body lamination layers but having no cut-outs superimposed upon the top and bottom respectively of said superimposed body lamination layers and shaped in such a manner as to cover also said semi-cylindrical spaces formed by said superimposed body lamination layers and to reach also to the tips of said projections, thus said superimposed body lamination layers together with said top and bottom plates forming within said camera body two semi-cylindrical film compartments on both sides of said central exposure chamber in said central camera body closed at the top, at the bottom and at all sides except the front and one shutter compartment in front of said central exposure chamber in said central camera body which is closed at the top, at the bottom and at all sides except the front.

JACQUES BOLSEY.